(12) United States Patent
Brudy et al.

(10) Patent No.: US 12,170,860 B2
(45) Date of Patent: Dec. 17, 2024

(54) NAVIGATION AND VIEW SHARING SYSTEM FOR REMOTE COLLABORATION

(71) Applicant: Autodesk, Inc., San Francisco, CA (US)

(72) Inventors: Frederik Brudy, Toronto (CA); Matthew K. Miller, Saskatoon (CA); Tovi Grossman, Toronto (CA); George William Fitzmaurice, Toronto (CA); Fraser Anderson, Newmarket (CA)

(73) Assignee: Autodesk, Inc., San Francisco, CA (US)

(*) Notice: Subject to any disclaimer, the term of this patent is extended or adjusted under 35 U.S.C. 154(b) by 78 days.

(21) Appl. No.: 17/887,371

(22) Filed: Aug. 12, 2022

(65) Prior Publication Data

US 2024/0056553 A1 Feb. 15, 2024

(51) Int. Cl.
*G06F 3/14* (2006.01)
*H04N 7/15* (2006.01)

(52) U.S. Cl.
CPC ........... *H04N 7/152* (2013.01); *G06F 3/1454* (2013.01)

(58) Field of Classification Search
CPC ..................................................... H04N 7/152
USPC ........................................................ 715/753
See application file for complete search history.

(56) References Cited

U.S. PATENT DOCUMENTS

2019/0361580 A1* 11/2019 Dowling ............... G06F 3/0484
2021/0182430 A1* 6/2021 Negi ................... G06F 21/6263
2021/0216704 A1* 7/2021 Peterson ............... G06Q 10/101
2021/0373676 A1* 12/2021 Jorasch ................... G06F 3/038
2022/0351142 A1* 11/2022 McGarr ................. H04L 51/216

OTHER PUBLICATIONS

Brudy et al., "Investigating the Role of an Overview Device in Multi-Device Collaboration," Paper No. 300, Proceedings of the 2018 CHI Conference on Human Factors in Computing Systems, Montreal, QC, Canada, Apr. 21-26, 2018, 13 pages.
Buxton et al., "Interfaces for Multiparty Videoconferences," Video Mediated Communication, 1997, pp. 385-400.
Byrnes et al., "Communication, collaboration and contagion: 'Virtualisation' of anatomy during COVID-19," Clin Anat., 2021, 34:82-89.

(Continued)

*Primary Examiner* — Ruay Ho
(74) *Attorney, Agent, or Firm* — Fish & Richardson P.C.

(57) ABSTRACT

Methods, systems, and apparatus, including medium-encoded computer program products, for collaboration and view sharing between users when performing editing operations over a shared document. A first portion of a shared document is displayed to a first user in a user interface of a first instance of a collaboration application of a first user. The displayed first portion comprises a first location of the first user within the shared document. In the user interface, an indication specifying a relative locational direction from the first location towards a second location of a second user within the shared document is provided. A second portion of the shared document is being displayed to the second user through a second instance of the collaboration application during a conference call between a set of users, where the displayed second portion includes the second location of the second user within the shared document.

20 Claims, 7 Drawing Sheets

(56) References Cited

OTHER PUBLICATIONS

Cherubini et al., "Deixis and Gaze in Collaborative Work at a Distance (over a shared map): a Computational Model to Detect Misunderstandings," Proceedings of the 2008 Symposium on Eye Tracking Research & Applications, Savannah, Georgia, Mar. 26-28, 2008, pp. 173-180.
Daly-Jones et al., "Some advantages of video conferencing over high-quality audio conferencing: fluency and awareness of attentional focus," Int. J. Human-Computer Studies, 1998, 49:21-58.
De Alwis et al., "GT/SD: Performance and Simplicity in a Groupware Toolkit," Proceedings of the 1st ACM SIGCHI Symposium on Engineering Interactive Computing Systems, Pittsburgh, Pennsylvania, Jul. 15-17, 2009, pp. 265-274.
Dewan et al., "Mixed-Focus Collaboration without Compromising Individual or Group Work," Proceedings of the 2nd ACM SIGCHI Symposium on Engineering Interactive Computing Systems, Berlin, Germany, Jun. 19-23, 2010, pp. 225-234.
Forbes.com [online], "Google Meet Trumps Zoom With Video Calls Inside Docs," May 18, 2021, retrieved on Aug. 12, 2022, retrieved from URL <https://www.forbes.com/sites/barrycollins/2021/05/18/google-meet-trumps-zoom-with-video-calls-inside-docs/?sh=6a166ea439f7>, 5 pages.
Forghani et al., "Media2gether: Sharing Media During a Call," Proceedings of the 18th International Conference on Supporting Group Work, Sanibel Island, Florida, Nov. 9-12, 2014, pp. 142-151.
Greenberg et al., "Implications of We-Awareness to the Design of Distributed Groupware Tools," Computer Supported Cooperative Work (CSCW), Oct. 2016, 25(4):279-293.
Greenberg et al., "Semantic Telepointers for Groupware," Proceedings of OzCHI '96 Sixth Australian Conference on Computer-Human Interaction, Hamilton, New Zealand, Nov. 24-27, 1996, pp. 54-61.
Greenberg et al., "Using a Room Metaphor to Ease Transitions in Groupware," Research report 98/611/02, University of Calgary, Dept. of Computer Science, Jan. 1998, 33 pages.
Greenberg, "Sharing views and interactions with single-user applications," ACM SIGOIS Bulletin, Mar. 1990, 11(2-3):227-237.
Grønbæk et al., "Proxemic Transitions: Designing Shape-Changing Furniture for Informal Meetings," Proceedings of the 2017 CHI Conference on Human Factors in Computing Systems, Denver, Colorado, May 6-11, 2017, pp. 7029-7041.
Gutwin et al., "Design for Individuals, Design for Groups: Tradeoffs Between Power and Workspace Awareness," Proceedings of the 1998 ACM Conference on Computer Supported Cooperative Work, Nov. 1998, pp. 207-216.
Gutwin et al., "Workspace Awareness in Real-Time Distributed Groupware," Report 95-575-27, University of Calgary, Dept. of Computer Science, 1995, 8 pages.
Gutwin, "Traces: Visualizing the Immediate Past to Support Group Interaction," Proceedings of Graphics Interface 2002, Calgary, Alberta, Canada, May 27-29, 2002, pp. 43-50.
Heinrich et al., "Exploiting Single-User Web Applications for Shared Editing—A Generic Transformation Approach," Proceedings of the 21st International Conference on World Wide Web, Lyon, France, Apr. 16-20, 2012, pp. 1057-1066.
Hill et al., "Awareness Support in a Groupware Widget Toolkit," Proceedings of the 2003 International ACM SIGGROUP Conference on Supporting Group Work, Sanibel Island, Florida, Nov. 9-12, 2003, pp. 258-267.
Isenberg et al., "Co-Located Collaborative Visual Analytics around a Tabletop Display," IEEE Transactions on Visualization and Computer Graphics, May 2012, 18(5):689-702.
Ishii et al., "Integration of Interpersonal Space and Shared Workspace: ClearBoard Design and Experiments," ACM Transactions on Information Systems, Oct. 1993, 11(4):349-375.
Karis et al., "Improving Remote Collaboration With Video Conferencing and Video Portals," Human-Computer Interaction, 2016, 31:1-58.
Karis et al., "Improving Remote Collaboration With Video Conferencing and Video Portals," Supplementary Information, Human-Computer Interaction, 2016, 31:1-58.
Khan et al., "ViewCube: A 3D Orientation Indicator and Controller," Proceedings of the 2008 Symposium on Interactive 3D Graphics and Games, Redwood City, California, Feb. 15-17, 2008, pp. 17-25.
Kühn et al., "Mixed-Focus Collaboration Activities for Designing Mobile Interactions," Proceedings of the 20th International Conference on Human-Computer Interaction with Mobile Devices and Services Adjunct, Barcelona, Spain, Sep. 3-6, 2018, pp. 71-78.
McFarlane, "Comparison of Four Primary Methods for Coordinating the Interruption of People in Human-Computer Interaction," Human-Computer Interaction, 2002, 17:63-139.
Neale et al., "Evaluating Computer-Supported Cooperative Work: Models and Frameworks," Proceedings of the 2004 ACM Conference on Computer Supported Cooperative Work, Chicago, Illinois, Nov. 6-10, 2004, pp. 112-121.
Neumayr et al., "Domino: A Descriptive Framework for Hybrid Collaboration and Coupling Styles in Partially Distributed Teams," Proceedings of the ACM on Human-Computer Interaction, CSCW, Nov. 2018, Article 128, 24 pages.
Neuwirth et al., "Computer Support for Distributed Collaborative Writing: Defining Parameters of Interaction," CSCW '94: Proceedings of the 1994 ACM Conference on Computer Supported Cooperative Work, Chapel Hill, NC, Oct. 1994, pp. 145-152.
Olsen et al., "Designing for the co-Orchestration of Social Transitions between Individual, Small-Group and Whole-Class Learning in the Classroom," IJAIED, 2021, 31:24-56.
Rae et al., "A Framework for Understanding and Designing Telepresence," Proceedings of the 18th ACM Conference on Computer Supported Cooperative Work & Social Computing, Vancouver, BC, Canada, Mar. 14-18, 2015, pp. 1552-1566.
Roseman et al., "Building Real-Time Groupware with GroupKit, a Groupware Toolkit," ACM Transactions on Computer-Human Interaction, Mar. 1996, 3(1):66-106.
Roseman et al., "Groupkit: A Groupware Toolkit for Building Real-Time Conferencing Applications," Interactive Technologies, Readings in Human-Computer Interaction, 1995, pp. 390-397.
Stefik et al., "WYSIWIS Revised: Early Experiences with Multiuser Interfaces," ACM Transactions on Office Information Systems, Apr. 1987, 5(2):147-167.
Support.Microsoft.com [online], "Use Whiteboard in Microsoft Teams," retried on Aug. 12, 2022, retrieved from URL <https://support.microsoft.com/en-us/office/use-whiteboard-in-microsoft-teams-7a6e7218-e9dc-4ccc-89aa-b1a0bb9c31ee?ui=en-US&rs-en-US&ad=US>, 5 pages.
Tang, "Findings from observational studies of collaborative work," Int. J. Man-Machine Studies, 1991, 34:143-160.
Tee et al., "Providing Artifact Awareness to a Distributed Group through Screen Sharing," Proceedings of the 2006 20th Anniversary Conference on Computer Supported Cooperative Work, Banff, Alberta, Canada, Nov. 4-8, 2006, pp. 99-108.
Vrzakova et al., "Looking for a Deal? Social Visual Attention during Negotiations via Mixed Media Videoconferencing," PACM on Human-Computer Interaction, CSCW3, Dec. 2020, Article 260, 35 pages.
Wallgrün et al., "A Comparison of Visual Attention Guiding Approaches for 360° Image-Based VR Tours," 2020 IEEE Conference on Virtual Reality and 3D User Interfaces (VR), Mar. 2020, pp. 83-91.
Wiltse et al., "PlayByPlay: Collaborative Web Browsing for Desktop and Mobile Devices," Proceedings of the SIGCHI Conference on Human Factors in Computing Systems, Boston, Massachusetts, Apr. 4-9, 2009, pp. 1781-1790.
Wong et al., "Support for Deictic Pointing in CVEs: Still Fragmented after All These Years?" Proceedings of the 17th ACM Conference on Computer Supported Cooperative Work & Social Computing, Baltimore, Maryland, Feb. 15-19, 2014, pp. 1377-1387.
Extended European Search Report in European Appln No. 23190644.7, dated Jan. 15, 2024, 7 pages.

* cited by examiner

```
                                    ┌─ 200
```

DISPLAY, IN A USER INTERFACE OF A FIRST INSTANCE OF A COLLABORATION APPLICATION OF A FIRST USER, A FIRST PORTION OF A SHARED DOCUMENT (E.G., A WORD PROCESSING DOCUMENT, A 3D MODEL, A PROJECT FILE, A VIDEO PRODUCTION, ETC.) TO THE FIRST USER, WHEREIN THE DISPLAYED FIRST PORTION COMPRISES A FIRST LOCATION OF THE FIRST USER WITHIN THE SHARED DOCUMENT 205

↓

PROVIDE, IN THE USER INTERFACE OF THE FIRST USER, AN INDICATION SPECIFYING A RELATIVE LOCATIONAL DIRECTION (E.G., SINGLE DIMENSION DIRECTION, 3D ARROW, ETC.) FROM THE FIRST LOCATION TOWARDS A SECOND LOCATION OF A SECOND USER WITHIN THE SHARED DOCUMENT (E.G., A POP-UP INDICATOR), WHEREIN A SECOND PORTION OF THE SHARED DOCUMENT IS BEING DISPLAYED TO THE SECOND USER THROUGH A SECOND INSTANCE OF THE COLLABORATION APPLICATION DURING A CONFERENCE CALL (E.G., A VIDEO AND/OR AUDIO CONFERENCE CALL) BETWEEN A SET OF USERS COMPRISING THE FIRST USER AND THE SECOND USER (E.G., ACTIVE SPEAKER DURING THE CONF. CALL), AND WHEREIN THE DISPLAYED SECOND PORTION OF THE SHARED DOCUMENT COMPRISES THE SECOND LOCATION OF THE SECOND USER WITHIN THE SHARED DOCUMENT 210

↓

*IN RESPONSE TO RECEIVING A USER INTERACTION OF THE FIRST USER WITH THE PROVIDED INDICATION, SCROLL THE SHARED DOCUMENT FROM THE FIRST LOCATION TO DISPLAY THE SHARED DOCUMENT AT THE SECOND LOCATION WITHIN THE USER INTERFACE OF THE FIRST USER 215*

*FIG. 2*

NAVIGATION AND VIEW SHARING SYSTEM FOR REMOTE COLLABORATION

BACKGROUND

This specification relates to collaborative work on a shared document between multiple users.

Computer communications and collaboration applications include different software products and/or services that support the work of multiple users in a remote work setup. In some cases, remote users work in parallel (or substantially in parallel, or synchronously) over a single document that they attempt to view and/or edit to provide a collaborative result. During such collaboration, users can share their display views, participate in video and/or audio conferences, and others that can support work processes such as content creation and decision making, among other examples. Collaborative tools can support the execution of video and/or audio conferences and view sharing of a user's view when interacting with a working version document.

SUMMARY

This specification relates to collaboration and view sharing between users when performing editing operations over a shared document.

In particular, this specification describes a method for collaboration and view sharing of a shared document between users participating in a conference call between a set of users including a first user and a second user. A first portion of the shared document can be displayed in a user interface of a first instance of a collaboration application of the first user. The displayed first portion includes a first location of the first user within the shared document. In the user interface of the first user, an indication specifying a relative locational direction from the first location towards a second location of the second user within the shared document can be provided. A second instance of the collaboration application displays a second portion of the shared document to the second user during the conference call. The displayed second portion of the shared document comprises the second location of the second user within the shared document.

Particular embodiments of the subject matter described in this specification can be implemented to realize one or more of the following advantages. Based on the supported collaboration through view sharing of one portion of a document within a user interface that maintains a view of another portion of the same document, the efficiency of synchronous or substantially synchronous editing of a document is improved. The described framework supports working configurations that facilitate fully remote mixed-focused collaborations by allowing a smooth transition between different views and work products and facilitating transitioning between different working modes such as individual work, work in pairs, small or large group discussions, or whole group sharing.

By peeking into someone else's view without changing one's current editing location, awareness of executed actions at multiple locations within a single document is provided. Users are notified seamlessly about viewport differences during collaboration over a discussed portion of a document. Further, the present implementations can support mixed-focus collaboration while improving the user experience and reducing the number of user interactions needed to be performed by users to achieve their goals. Also, the provided indications of a relative locational direction, for example, for the current active speaker during a conference call, can support faster and efficient repositioning of a user within a viewed document based on pushed information associated with location identification of other users collaborating with the current user over the viewed document in a shared set-up. Since a user interface can nest a temporary preview of another user's document location and co-edit with the other user at another location of a document without changing his location in the document within the initial user interface, multi-screen sharing can be supported by the collaboration application in a manner that facilitates effective collaboration.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 2 shows an example of a process to provide an indication, on a user interface of a collaboration application used by a first user to collaborate over a shared document with a second user, where the indication specifies a relative locational direction towards a location of the second user within the shared document in accordance with implementations of the present disclosure.

Like reference numbers and designations in the various drawings indicate like elements.

DETAILED DESCRIPTION

Figure 1:
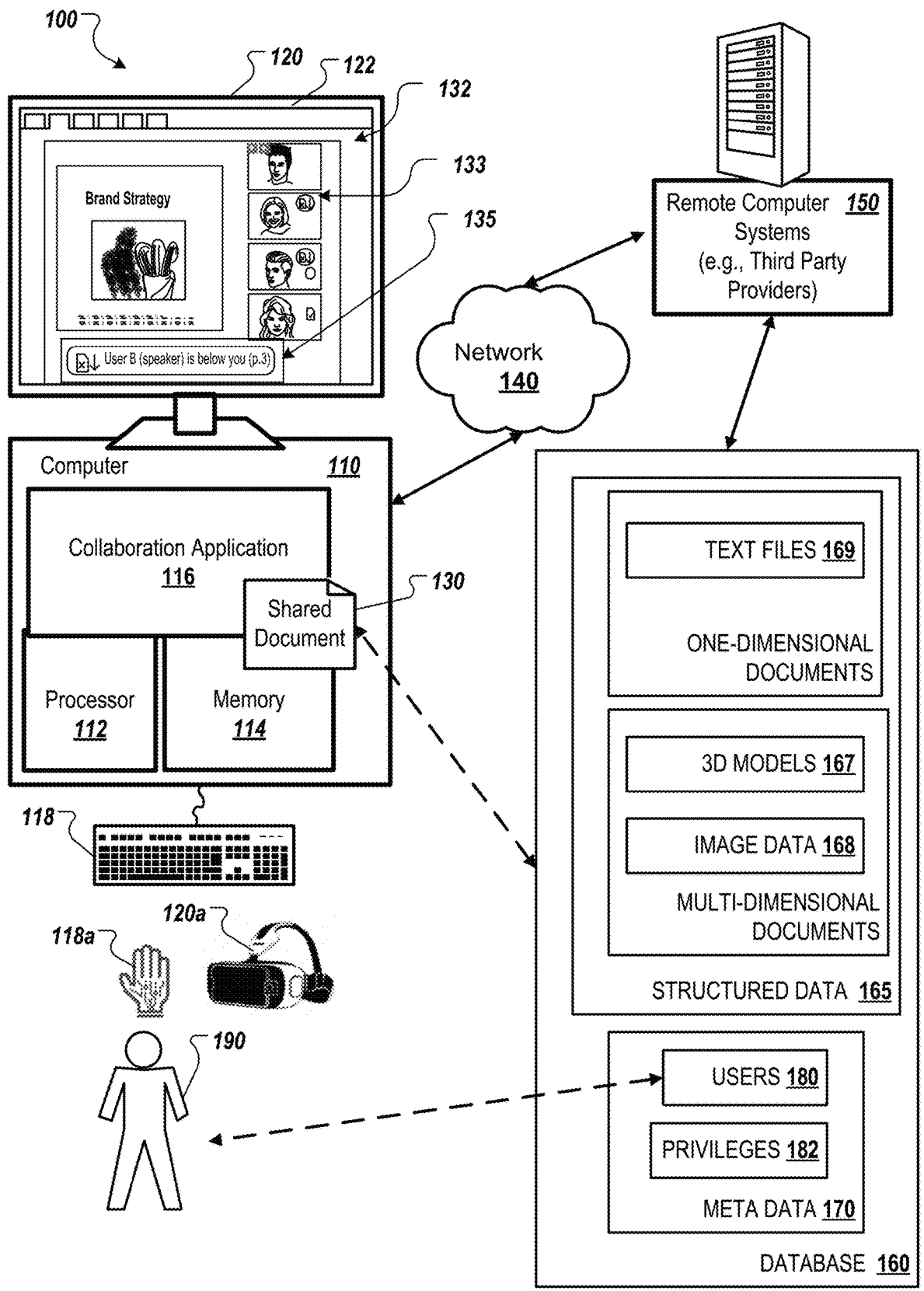
FIG. 1 shows an example of a system usable to support collaboration and view sharing between users when performing editing operations over a shared document in accordance with the implementations of the present disclosure.

The present disclosure describes various tools and techniques for collaboration and view sharing between users when performing editing operations over a shared document.

Mixed-focus collaboration is a key to work processes such as brainstorming, design reviews, complex content creation, decision making, manufacturing scripts, and others. In some implementations, when users interact over a shared document during a conference call, they rely on tools to collaboratively interact with a shared document to achieve a common goal (e.g., a particular, new/revised version of the shared document). The conference call can include a video conference call, an audio conference call, or a video and audio conference call. In some instances, one user may participate in the conference call over an audio connection (e.g., relying only on audio tools (e.g., speaker and/or audio receiver) and setup to interact with the other users), another user may participate over a video and audio connection (e.g., relying on a video and audio tools and setup to interact), and yet another user may participate only over a video connection (e.g., relying only on a video tool and setup (e.g., camera) to stream video feed of the participant during the interaction with other users). Further, it can be appreciated that any other combination of audio and video connections of users can be included in the context of the conference call setup between users interacting over a shared document.

Mixed-focus collaboration may involve editing of a document by multiple users at multiple locations within the document, where at one location, users may interact and perform editing operations. Thus, a document is viewed from multiple different remote instances and edited from at least some of the different viewpoints at a set of locations within the document.

Synchronous remote collaboration often requires multiple tools and techniques to support interaction between users during a creative process that has no fixed sequence of operations defined for each user. Therefore, users desire collaboration applications to provide flexible and seamless tools to integrate into interactive processes over a common shared document.

People use audio and video calls for real-time, high-bandwidth communication and real-time groupware to synchronously work on artifacts such as text files, slide decks, three-dimensional (3D) models, or interface designs. However, generally screen sharing forces everyone to see the same portion of content displayed and does not allow for collaborative work of users while switching locations of editing within the document (content to be edited).

In accordance with the implementations of the present disclosure, calling (or video conferencing) and real-time groupware can be combined to enable remote collaboration that can result in a smooth and flexible workflow that is supported by efficient tools that reduce the number of user interactions with the collaboration application and thus improve the timeliness and efficiency of the process flow.

FIG. 1 shows an example of a system 100 usable to support collaboration between users that work remotely on shared documents during a conference call. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including conference call programs (e.g., video conference call programs, audio conference call programs, or a combination thereof), which support view sharing and editing functions.

The computer 110 includes a collaboration application 116 that includes implemented logic to help users involved in a common task (e.g., edit a common shared document in parallel and/or synchronously) to achieve their goals. The collaboration application 116 can be groupware designed to support group intentional processes and can provide software functionality to facilitate these processes. In some implementations, the collaboration application 116 can be used for the initiation and execution of conferences and sharing of views (display sharing) of different users while performing editing and/or viewing operations over a shared document. In some implementations, a conference (or a conference call) can include an audio and video conference where at least one user is joining the conference with a video stream and at least one of the users is joining with an audio stream. For example, a conference call between two users where one of the users is joining with video and audio and a second one is joining only with audio can be considered a video conference. In some implementations, a first user can share a current view of the shared document that includes a portion of the shared document, for example, at a particular location (or point). For example, the first user can open the shared document in a user interface element such as a view window. The view window can automatically move a displayed first portion from a first location to a second location in the shared document in response to a user interaction of the first user. The first user can be presently viewing page three (3) of the document and can share the current view with other users as part of a conference call activity. The other user can automatically move their displayed portion to a displayed portion by the presented, e.g., through automatic scrolling between locations in the document or through jumping between locations.

The collaboration application 116 can run locally on the computer 110, remotely on a computer of one or more remote computer systems 150 (e.g., one or more third party providers' one or more server systems accessible by the computer 110 via the network 140) or both locally and remotely.

In some implementations, the collaboration application 116 can obtain a document from a database 160. A user 190 can interact with the collaboration application 116 to initiate or join an already initiated video and/or audio conference to work collaboratively on an obtained document, for example, a shared document 130, with other users of the collaboration application 116. In some implementations, the collaboration application 116 can provide a view 132 (e.g., including a portion of the shared document that is presented within a user interface 122) to the user interface 122 on a connected display device 120 to display a document shared with a set of users. The rest of the user(s) can receive a shared view of the document at different instances of the collaboration application 116.

The collaboration application 116 can present the user interface 122 on the display device 120 and multiple user interaction elements as part of the user interface 122 to support collaborative activities, such as opening a document, sharing your view, sharing a desktop view, performing a conference (e.g., an audio and/or video conference), or engaging in a chat function, receiving and providing information to other users, interacting with other users, among other examples.

In some implementations, the collaboration application 116 can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, and 120 can include a VR/AR input glove 118*a* and/or a VR/AR headset 120*a*.

In some implementations, the user 190 can share the view 132 of the shared document 130 that is presented on the display device 120 and visually show how he/she is editing the document at a particular location in the document during the video and/or audio conference. It should be appreciated that the users view of the document on the user interface 122 can change while the user is performing reviewing and/or editing operations, e.g., based on scrolling between different locations (e.g., pages, sections of a structured document, 3D directions, etc.). In some implementations, while user 190 is interacting with the shared document 130, another user can interact with the same shared document 130 at another computer and based on different editing operations, while the changes done to the shared document 130 can be synchronized. The synchronization of the changes done to the shared document 130 can be done at the database 160 or at an external component (e.g., a document service hosted on a separate host) handling data synchronization operations.

In some implementations, the shared document 130 can be accessible through the database 160 or through another software application providing document management services and couples to the database 160.

In some implementations, the database 160 can store data including structured data that can include one-dimensional documents (e.g., text files 169 for example, text documents in WORD format, PAGES format, or other formats) or multi-dimensional documents (e.g., charts, spreadsheets, diagrams, 3D models 167, image data 168).

In some implementations, the database 160 includes metadata 170 that is generated based at least on the structured data 165 and other data stored at the database 160. The metadata 170 can include data for users 180 that are associated with access rights for reading, writing, modifying, copying, or other operations to be performed when working with data on the database 160. For example, the user 190 is defined as a user from the users 180 and can have access right to the shared document 130 according to correspondingly defined privileges for the user 190 and the shared document 130 at the privileges 182 of the metadata 170. In some implementations, the metadata 170 can be persisted outside of the database, for example, at a remote service that handled authorization and authentication of users for data operations performed at the database 160.

The systems and techniques described herein are applicable to any suitable collaboration application environment. Thus, in some implementations, the collaboration application 116 can be a communication platform supporting video calls and screen sharing to view portions of documents that are collaboratively edited by a set of users authorized to view and edit the document, and to provide indications specifying relative locational direction(s) as described further at FIGS. 2, 3, 4A and 4B. The display device 120 can render a particular view of the document while the user is viewing and/or editing a portion of the document at a given location. Other applications are also possible.

In accordance with implementations of the present disclosure, when the shared document 130 is presented by the user 190 on the user interface 122 in the context of a conference call between the user 190 and other users authorized to access the shared document 130, indications for the viewing and interactions with the shared document 130 performed by other users (who are part of the video or phone conference) can be provided on the user interface 122.

In some implementations, an indication that specifies a relative locational direction from the user's position in the shared document 130 towards another document position where a second user is in the shared document 130, can be provided in the user interface 122 of the user 190. In some implementations, the indication specifying the relative locational direction can be provided during the course of a conference call between the user 190 and one or more other users, where the user 190 and at least one of the one or more other users have opened the shared document 130, for example, and are displaying a portion (same or different) of the shared document 130.

In some implementations, the indication can be a user interface element that can be presented in multiple ways. For example, the indication can be an icon 133 that can be attached to an avatar picture of the second user, or as a user interface text box element that is presented as overlaying some portion of a video feed of the second user that is displayed for the user 190 on the user interface 122 in the context of a conference call that is a video conference. For example, the icon 133 can present the relative locational direction as an arrow identifying a one-dimension direction towards the second position, e.g., below or above within a word document. Also, the indication can be a relative location direction that can also further identify the exact position of the second user. For example, the text box may provide a direction (such as above or below within a word document), as well as, a reference to a particular location (such as a page) where the second user is positioned in the shared document 130.

As described further below in reference to FIG. 3 and in accordance with the implementations of the present disclosure, the user interface 122 can present the view 132 of the shared document 130 and provide indications for participants in a conference call. The provided indication, such as a relative directional location can be provided to direct the user 190 towards a location of another user without assuming that user 190 is aware of the exact location of the shared document 130 that he is reviewing. In accordance with implementations of the present disclosure, the indication may be self-sufficient for the user 190 to determine a difference and direction of the difference between a location (or position) the user 190 in the shared document 130 and a location of another user part of the call. Such determination of a difference and direction can be performed without utilization of further or separate interface(s) to determine such difference (e.g., there is no need for the user 190 to identify the page of the shared document 130 that he is looking at to determine the relative directional location of another user). In practice, the user 190 can immediately see on the user interface 132, for example, based on the icon 133, that the user related to that icon 133 is below him in the shared document 130.

In yet another example, the indication can be provided on the user interface 122 as a pop-up indication 135, which can be presented at various locations within the user interface 122. For example, as shown on the view 132, the indication can be presented as the icon 133 on the avatar photo of the second user, where the icon can include an arrow indicator to show the direction towards the location where the second user is. For example, the shared document 130 can be a text file that is a one dimensional document and the arrow can be an upward facing arrow to indicate that the location of the second user is at a prior location within the shared document

130 compared to the first user's location presented on the user interface 122 at that moment. Further, the icon can also include an indication for the exact location within the shared document 130, e.g., page three (3).

Figure 3:
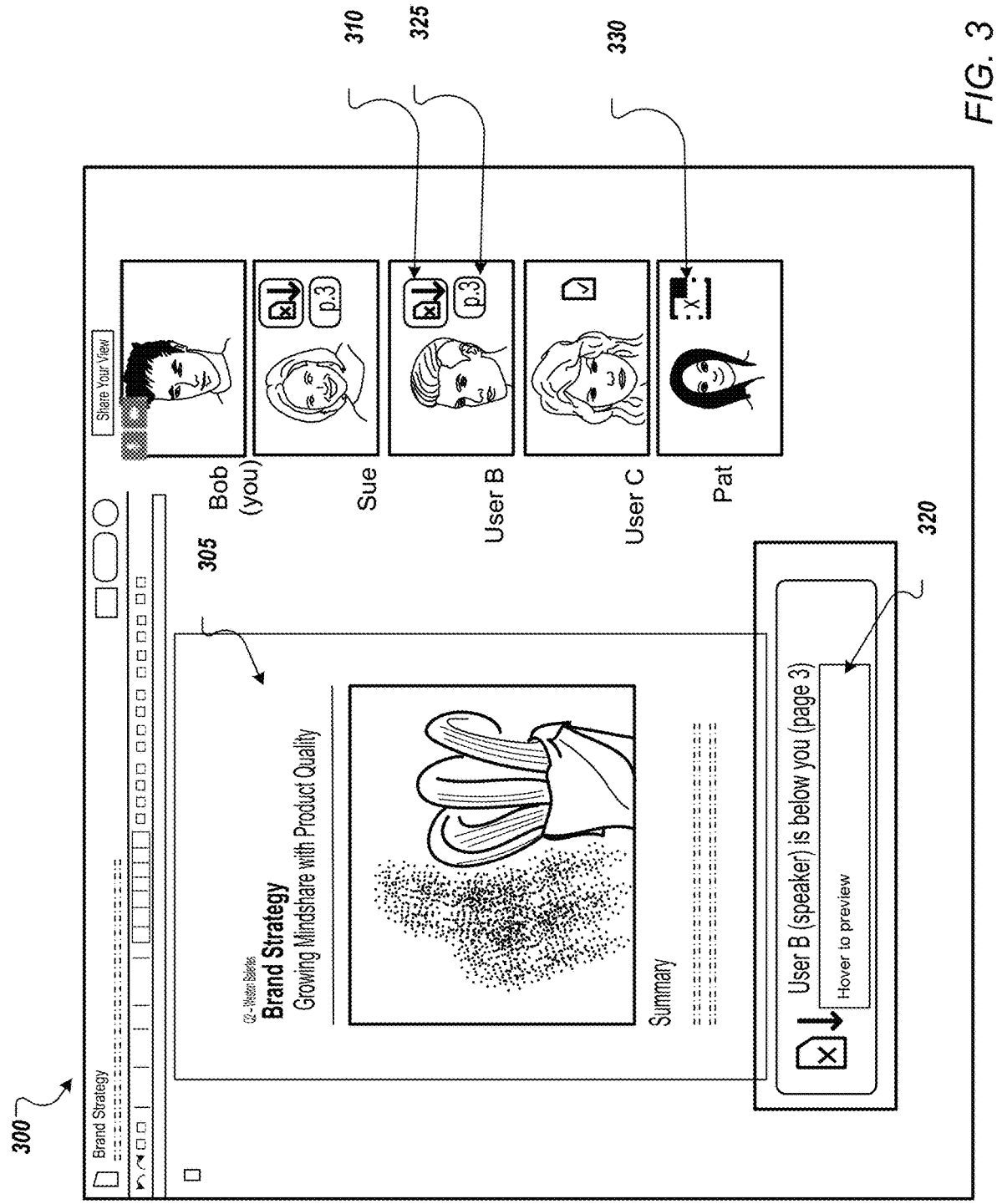
FIG. 3 shows an example user interface of a collaboration application that supports collaboration and view sharing between a set of users in accordance with implementations of the present disclosure.
Figure 4A:
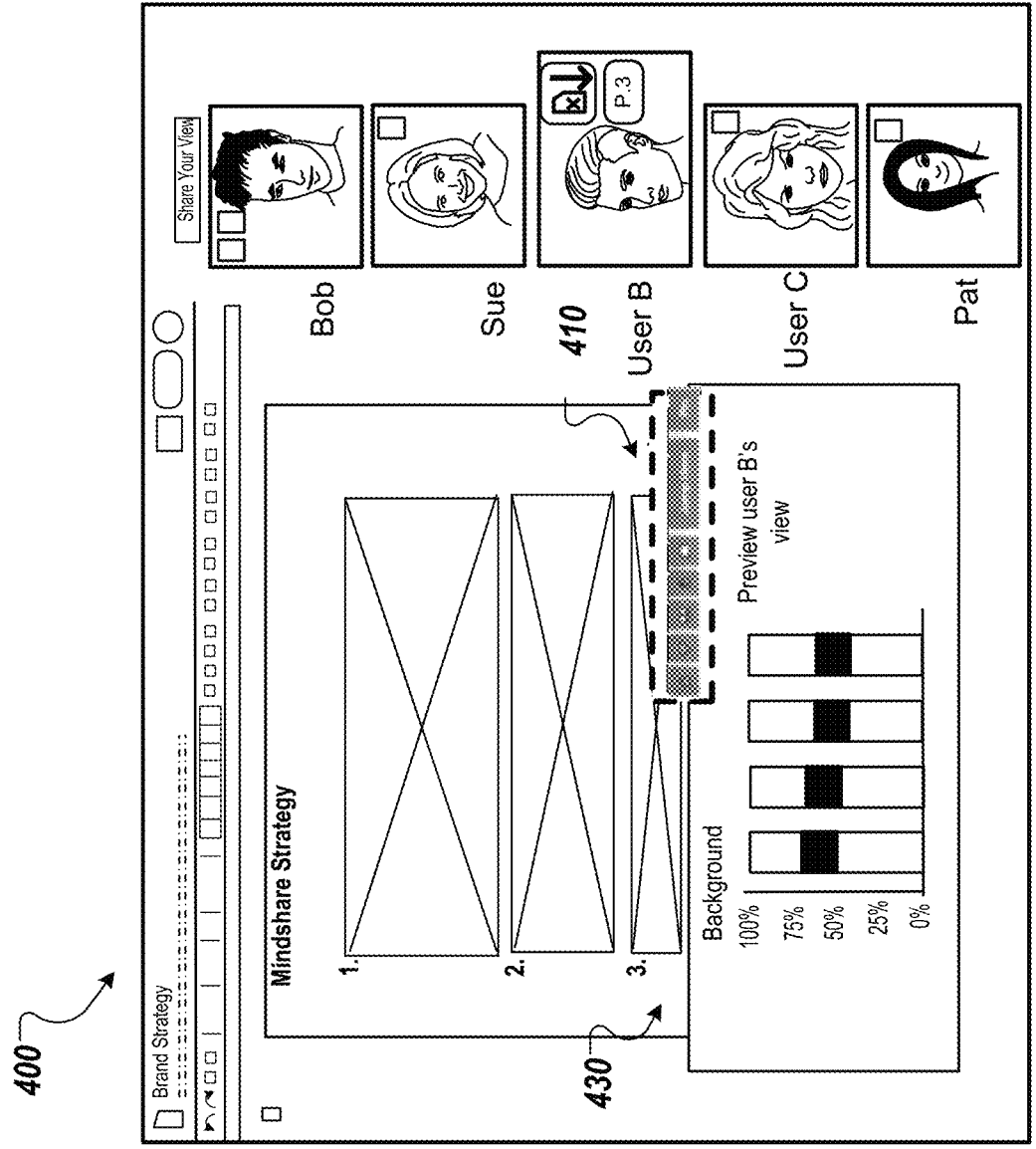
FIG. 4A shows an example user interface of a collaboration application that allows previewing of portions of a shared document viewed by another user within the display of a current portion of the shared document by a given user working with the collaboration application in accordance with implementations of the present disclosure.
Figure 4B:
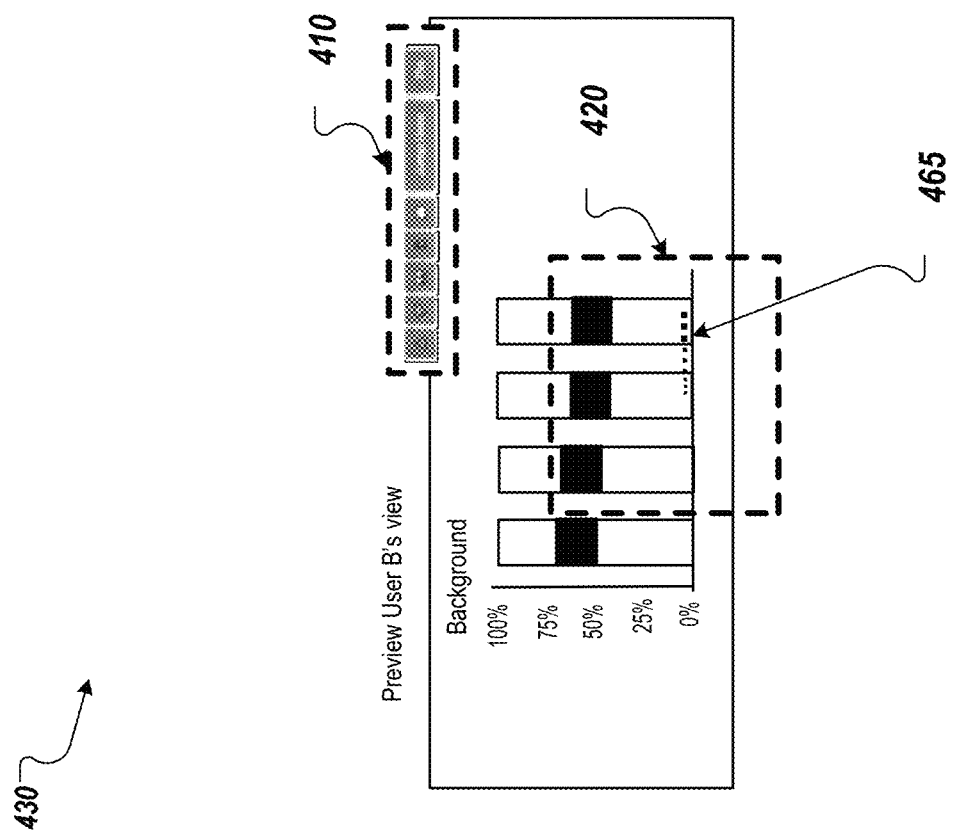
FIG. 4B shows an example temporal preview window including a viewed portion of a shared document by a collaborating user of a current user that can be overlaid on the current user's interface while keeping the location of the current user shown in the current user's interface in accordance with implementations of the present disclosure.

In some implementations, the indication can take the form of a preview window or a pop-up window where details of the second location of the second user can be provided as further described in FIGS. 3, 4A, and 4B.

FIG. 2 shows an example of a process 200 to provide an indication, on a user interface of a collaboration application used by a first user to collaborate over a shared document with a second user, where the indication specifies a relative locational direction towards a location of the second user within the shared document in accordance with implementations of the present disclosure.

In some implementations, the process 200 can be executed in a system environment substantially similar to (or equivalent to) the system 100. The process 200 can be executed at an instance of a collaboration application used by a first user to interact with other users over a common shared document. In some implementations, the common shared document can be stored in a database, such as the database 160 of FIG. 1, and can be accessed by multiple users to edit the shared document at least partially in parallel and/or synchronously. For example, a first user can be performing editing operations over a text document at the first portion of the document (e.g., the first chapter of the document), and a second user can be performing editing operations over the same text document at a second portion of the document. The second portion of the document that is associated with editing from the second user can be displayed at a user interface of the second user. The second portion can correspond at least in part to the first portion (e.g., by having an overlap between the first and second portion above a threshold, such as 50% overlay), or can be only slightly overlapping, or can be completely separate distinct portions having no overlap/overlay, among other example configurations.

At 205, the first portion of a shared document is displayed to a first user. The first portion is displayed in a user interface of a first instance of a collaboration application of the first user. In some implementations, the collaboration application can provide multiple functions to support interactions between users that are remotely located and interact over a common shared document. In some implementations, the collaboration application supports view sharing between users participating in a collaboration group or virtual room created for a set of users that interact with the shared document, e.g., to change formatting, perform editing operations, create new content, update content, etc. In some implementations, the first user's computer is displaying the first portion of the shared document, while the same shared document can be accessed by other users, according to access privileges, through other user interfaces and at different portions of the document. In some implementations, the collaboration application can be integrated with functionality to support parallel processing of common documents, for example, documents stored at a local or external data storage, such as the database 160 of FIG. 1.

In some implementations, modifications (e.g., adjustments, inclusions of new content, removal of content, etc.) made to the shared document by one user from the set of users can be propagated to the instance of the collaboration application of the other user. For example, if another user is viewing a portion that is currently edited by a current first user, the viewing perspective of the other user can be dynamically updated once the edits are submitted by the first user (e.g., at a database sharing and managing synchronized access to the document).

At 210, an indication that specifies a relative locational direction from the first location towards the second location of a second user within the shared document is provided in the user interface of the first user. The second user is displaying a second portion of the shared document through a second instance of the collaboration application that the second user is using during a video (or telephone) conference with the first user.

In some implementations, the first user and the second user can be part of a video (or telephone) conference between a set of users including the first user and the second user. During the conference, two or more users can be reviewing a shared document that can be displayed through their instances of the collaboration application.

In some implementations, the displayed second portion of the shared document includes the second location of the second user within the shared document. For example, the second user can view page three (3) (e.g., displayed on a user interface of the instance of the collaboration application that the second user is using) of the shared document that is above the location where the first user is viewing and sharing with the second user through his instance of the collaboration application.

In some implementations, the second location can be identified in the context of a conference call where at least the first and the second user are reviewing portions (same or different) of the shared document. In some implementations, the conference call can be performed through instances of the collaborative application associated with the different users. In some implementations, the second location can be identified while the second user is recognized as speaking during the conference call.

In some implementations, the identification of a second location within the shared document can be performed in response to determining that two or more users part of the conference call are performing a conversation and are displaying at their own instance of the collaboration application portions of the shared document.

In some instances, only a single user can be identified as an active speaker, or in other instances, multiple users can be identified as active speakers. The determination of who is the active speaker can be performed according to implemented logic that can rely on rules and criteria related to volume characteristics of the speaking users, the time span of speaking activities, or input from a user to take a role of an active speaker while others can be muted, among other examples of identification of active speaker(s).

In some implementations, the indication can include a one-dimensional direction relative to the position of the second user, e.g., in an upper portion of the document, such as page three (3) of the document, while the first user is displaying page six (6) of the same document. In some implementations, the indication can specify a relative locational direction that is a 3D arrow in a shared document that is a 3D modeling document defining an object in a 3D space. In some implementations, the shared document can be used in the context of collaborative work projects in the manufacturing field, building construction management, movie and animation productions, or other fields. For example, the shared document can be a 3D model of an object that is to be manufactured by a manufacturing process, where the model is edited by a set of users during a collaboration process. During interaction over a 3D model, users can transition between their individual and shared perspectives within the 3D model. In some other examples, the shared document can be a building information model for a construction management project that is a multidimensional model that can be collaboratively defined during a conference call with view sharing and/or view peeking (e.g., of the displayed content of the shared document at another user's interface) between multiple parties. In some examples, the shared document can be a video document that is undergoing collaborative development as part of a video production project.

In another example, users can work together in virtual reality, share viewpoints across devices, different locations, etc. The present implementations can facilitate lightweight interactions that allow for quick viewing of collaborator's content by providing position identifiers to support efficient transitions and to improve mixed-focus collaborations.

In some implementations, the indication is provided in the user interface of the first user (at 210), in response to identification of the second user as an active speaker during the conference call.

In some implementations, the indication that is provided at 210 can include a pop-up indicator, that can be displayed in the user interface of the first user (e.g., at various locations within the user interface) to provide details of the second location of the second user in the shared document. In some implementations, the indication can be a pop-up indicator as the pop-up indicator 320 of FIG. 3 described below, that can be a user interface element that is pushed to the user interface of the first user to provide information for the relative locational direction of the second user. As indicated in FIG. 3, the relative locational direction within the example shared text document 305 (that is a one-dimension document) is defined as "User Y (speaker) is below you (page 3)." In that example, the pop-up indicator 320 is pushed to the user interface of the first user for a second user that is also identified as an active speaker at the time of pushing the pop-up indicator.

In some implementations, when a pop-up indicator is displayed in the user interface of the first user, the first location of the first user is kept (or maintained to be shown) at the first location of the first user. In some implementations, based on a user interaction (e.g., a mouse click, hovering over the pop-up indicator, voice command, gesture, or else), the pop-up indicator can be transformed to provide a temporary preview of that second location where the second user is located (in the user interface of the instance of the collaboration application of the second user) while keeping the first location of the first user shown in the user interface of the first user.

At 215, in response to receiving a user interaction of the first user with the provided indication, the shared document is repositioned in the display of the shared document from the first location to display the shared document at the second location within the user interface of the first user. In some implementations, in response to receiving the user interaction at 215, the first user can open the temporary preview of the second location in an editing mode where the first user can make changes to a second portion of the shared document associated with the second location that is displayed for the second user. In some implementations, previewing and editing of the shared document through the temporary preview of that second location (portion) of the second user's location can be performed even if the shared document is repositioned to display that second location or even another different location within the user interface of the first user.

In some instances, the repositioning of the display can be performed as scrolling from the first location to the second location within the user interface of the first user, as jumping between the two locations, as dynamic reloading of the preview of the user interface of the first user to replace the first location with the second location, among other techniques to provide a different display of a different portion of the shared document.

FIG. 3 shows an example user interface 300 of a collaboration application that supports collaboration and view sharing between a set of users in accordance with implementations of the present disclosure. In some implementations, the user interface 300 of the collaboration application can substantially correspond to the user interface 122 on the display device 120 of FIG. 1, and/or to the user interface of the first user as described for FIG. 2.

In some implementations, the collaboration application is accessed through multiple instances by each user (or a subset) of the set of users that can participate in a conference call to collaboratively edit a shared document 305. The user interface of each user can provide multiple user interaction elements that can be engaged by a user to initiate operations related to the conference call, such as volume adjustment, camera adjustment, video sharing, interaction with other users (e.g., chat), as well as operations related to editing the shared document, such as modify content from the document, incorporate new content, remove content, change the formatting and/or settings of the document, etc.

In some implementations, the user interface 300 of the collaboration application displays a first portion of a shared document 305 to the user, where the displayed portion includes a first location of the first user within the shared document 305. In the present example, the document is a single dimension word processing file, however, other example documents suitable to be presented on a user interface are within the scope of the present disclosure. In the context of the example user interface 300, a first page of a text file that is shared with a set of users is displayed at the user interface 300. The set of users that are part of the conference call can be identified as a list of participants, for example, presented on the right-hand side of the user interface 300 with image avatars. In some instances, the conference call can include video conference calls for at least some of the participants, and the user interface 300 can present the list of participants to include video feeds from those of the users that are connected with video tools to the conference call. For example, the video feeds can be projected from a camera capturing their images at the instance of the collaboration application they are using.

In some implementations, the user interface 300 includes at least one indication related to at least one other user who is part of the conference call, that specifies a relative locational direction from the first location towards a second location of at least one other user within the shared document 305. For example, indications can be displayed at the user interface 300 as icons related to corresponding users who are part of the conference call, and provide a direction to the location where the particular user is currently viewing (at their separate user interface of another instance of the collaboration application) a portion of the shared document 305. In some implementations, the shared document 305 can be similar or substantially similar to the presented shared document 130 of FIG. 1 that is provided for display on the user interface 122 of the user 190 of FIG. 1. The user viewing the user interface 300 can be similar to the user 190 of FIG. 1 and can be provided with view 305 of the portion of the shared document.

For example, at 310, indications as to the relative locational direction of some of the users' part of a conference call can be presented. For example, user B is provided with a relative locational direction in the context of Bob who is part of a conference call together with a set of users (including user B) and is provided with a view 305 of the shared document. In the example, Bob does not have to be provided with information for a particular location of the document that corresponds to the view of the document on the user interface 300. Bob is provided with a relative locational direction of user B that identifies a relative positioning of user B in comparison to a location of Bob, without requiring Bob to become aware of, verify, or compare a difference between the location of Bob and the location of user B. In that example, user B is provided with an indication that includes information for a relative location direction, i.e., below the user viewing the user interface 300. User B is provided with an indication 310 that includes information for the relative location direction, i.e., below the user, as well as information for the particular location of the user B in the shared document, i.e., page three ("p.3"). The information for the particular location of the user B can be provided with an indication 325 that can be separate from the indication 310. In some implementations, the indication for the relative locational direction and the particular location can be provided with a single common indication in an icon for a user, where the icon can be overlaid on an image or on the video feed from that user (in the cases where the user is connected over a video connection to the conference call).

In some implementations, not all users who are part of the conference call need to also be previewing the shared document. In those cases, an indication that a user is not currently viewing the shared document can be provided as an icon related to the avatar of the user. For example, Pat is not viewing the shared document and is provided with the icon 330 to identify that during the conference call she has not opened and/or is not viewing the shared document through her relative instance of the collaborative application, or through other means for accessing the shared document.

In some implementations, users who are having the same location in the shared document may be also identified with a particular icon (e.g., including a check mark for user C) to identify that the location of the shared document that is viewed by Bob at user interface 300 is the same as the location that is viewed by that user (e.g., user C). In some instances, the identification of whether the viewed portion is the same can be performed according to a comparison of the overlap of the views of the users with a certain threshold (e.g., predefined portion of overlap such as at least 60% overlap of the views).

In some implementations, the indication as provided according to operation 205 of FIG. 2 on the example user interface 300, can include an indication as presented at 310 for one or more other users. The indications at 310 may also include information as to whether a user is currently speaking or not, for example, with a different colored or styled (different pattern or label, among other examples) icon.

In some implementations, at 310, the indications can be presented as icons overlaid on video feeds or image avatars for different users participating with video and/or audio setups, to the conference calls of a set of users collaboratively working on the shared document. The icons can identify collaboration statuses of the set of users relevant to the shared document. In some cases, each status of each user identifies a current viewing position, where the current viewing position includes positions within the shared document and within the collaboration application. Further, the statuses can identify the type of interaction that each of the users is performing currently with the shared document, such as editing, viewing, not viewing, etc.

In some implementations, the indication as provided according to operation 205 of FIG. 2 on the user interface 300, can include an indication as presented at 320, which is a pop-up indication for displaying in the user interface 300 to provide details of the location of a given user, such as user B, within the shared document 305. In some implementations, the pop-up indication can be pushed to the user interface 300 in response to determining that user B is the active speaker in the conference call. In some implementations, if the active speaker is changed, the indication can be updated to provide information for the new active speaker.

In some implementations, a user interacting with the user interface 300 can perform a user interaction with a user interface element, or send a voice or gesture command that can be interpreted by the user interface 300 to activate previewing of the location associated with a user (from the set of users who are part of the conference call) that is viewing the document currently. For example, a hovering operation can be performed over the indicator 320 to request previewing of a portion of the shared document 305 that is currently being viewed by user B. In response to such an operation to request a preview, a temporary preview of the portion of the shared document 305 that is displayed by user B (in their instance of the application) can be provided within the user interface 300, while keeping the location (in the present example, this is a location within page one (1) of the document 305) of the user of user interface 300 shown in the user interface 300. In some implementations, such a temporary preview can replace the presentation of the pop-up indication 320, and for example, can be such as a temporary preview 430 of FIG. 4A described below.

In some implementations, a request for providing a temporary preview of a portion of the document that is viewed by another user can be initiated through an interaction with an indication such as the indication 310 of FIG. 3.

In some implementations, the pop-up indication (e.g., 320) and/or temporary preview of a portion of the shared document viewed by another user, such as an active speaker, can be automatically pushed to the user interface 300. For example, based on a pre-configuration of sharing a view of a particular user or on a dynamic determination of the active speaker, the pop-up indication or the temporary preview of the viewed portion of another user can be automatically pushed to the user interface 300. In some instances, the pop-up indication, or the temporary preview can be positioned to partially overlay a portion of the displayed portion of the shared document 305.

FIG. 4A shows an example of a user interface 400 of a collaboration application that allows previewing of portions of a shared document viewed by another user within the display of a current portion of the shared document by a given user working with the collaboration application in accordance with implementations of the present disclosure.

In some implementations, the user interface 400 can correspond to the user interface described for the first user in FIG. 2 where an indicator is displayed at operation 205. Further, the user interface 400 can correspond to the user interface 300 of FIG. 3 that has a different view corresponding to a view that can be presented if the user of the user interface 300 had requested to provide a temporary preview of a given user's portion of the document being discussed in the conference call, for example, user B of FIG. 3.

In some implementations, the user interface 400 is of a first user, for example, as described in FIG. 2, and displays a first portion of a shared document to the first user (e.g., 205, FIG. 2). While the first user is viewing this first portion that includes a first location within the shared document, another user from the users (who are part of a conference call) may be viewing another portion of the shared document. In some implementations, not all users in the conference call may be active users who are viewing the document. In some implementations, those of the users that are viewing the document (or just one or a subset of them) can be presented with an indication providing information for a portion at a location within the shared document which these users are currently viewing through their separate user interfaces.

In some implementations, based on a configuration of the collaboration application, the user interface 400 can have pushed to it a temporary preview of another portion of the shared document within the user interface 400 without changing the location of the first user and/or the portion that is presented in the user interface 400 for that first user. The temporary preview can be a preview 430, and can provide a display of a second portion of the shared document, associated with another user, e.g., user B. The temporary preview 430 can overlay at least a portion of the displayed first portion of the user of the user interface 400, thus allowing the user of the user interface 400 to capture simultaneously a view of the original portion of the document that he was viewing at the time when the other user B was viewing a different portion of the document. In some implementations, the application can be configured such that a temporary preview 430 is pushed to the user interface when an active speaker is identified, for example, for a predefined set of time, or only when that active speaker is also viewing a different portion of the document (e.g., overlapping with the portion of the shared document viewed by the first user at least to a certain threshold value (e.g., 50% overlap)), among other criteria that can be defined for providing the temporary view for display. While the temporary view is automatically provided in some implementations, in other implementations, the temporary view is provided on the user interface 400 only based on a user request and interaction with an indication that is provided as described in relation to FIGS. 2 and 3.

In some implementations, in response to determining that the second user is a current speaker, the temporary preview 430 of the second portion of the shared document within the user interface of the first user is displayed. In some implementations, the preview 430 includes an interactive menu 410 that allows the first user to provide feedback for the content in the displayed preview window 430. For example, the interactive menu 410 includes different icons to send approval or disapproval of the displayed portion of the shared document, and/or further emotion icons that can improve the user experience during the collaborative work over the shared document. In some implementations, the interactive menu 410 can include a button that can navigate and adjust the display of the first user in the user interface 400 based on the second portion of the shared document. For example, the interactive menu 410 can include a "Jump Here" button, which after activation by a user can result in a change of the display of the document on the main preview of the first user, and provide the second portion of the shared document for display to the first user instead of the previously displayed first portion of the shared document.

FIG. 4B shows the example temporal preview window 430 of FIG. 4A including a viewed portion of a shared document by a collaborating user of a current user that can be overlaid on the current user's interface, while keeping the location of the current user shown in the current user's interface in accordance with implementations of the present disclosure.

In some implementations, the temporary preview 430 of the second portion of the shared document is a user interface element that allows the first user to perform gestures within the temporary preview 430. For example, when the temporary preview 430 is displayed as an overlay to the displayed first portion of the shared document on the user interface of the first user, the first user can perform gestures, such as gestures with cursor trails as presented at section 420 of the temporary preview 430. In such manner, the first user can perform a gesture on the temporary preview 430 that can be visible for the second user at the user interface associated with the second user that is displaying the second portion of the shared document. In some instances, the gestures can include the use of cursor trails of different colors and different patterns that can temporarily appear for the second user while the first user is moving their mouse (or input means to represent a gesture) on the temporary preview 430. At section 420, in FIG. 4B, it is presented that the first user of the user interface, in 400 of FIG. 4A is where the temporary preview 430 is located and can use cursor trails 465 (e.g., colored dots that temporarily appear as their cursor (mouse cursor) moves on the temporary preview).

In some implementations, the temporary preview 430 can be configured to allow the first user to perform an editing operation at the shared document at the second portion of the shared document. The editing operations can be performed within the temporary preview 430, while the first user is still keeping the first location of the user shown on the user interface 430, and the temporary preview 430 is overlaid on the user interface 400 of the first user at FIG. 4A. According to the implementations of the present disclosure, the first user can be in the middle of a change in one part of the shared document (performed in the main user interface 400 of FIG. 4A) and then can be provided with an indicator, such as an overlay pop-up editor that can be the temporary preview 430 in an editing mode. Through the temporary preview 430 in an editing mode, the first user can edit another portion of the shared document, (different from the first portion displayed at the main user interface 400 of FIG. 4A) where the other portion can be a second portion that is currently being viewed by a second user, where the editing to the second portion can be performed without losing any of the editing context within the main user interface 400 and related to the first portion of the shared document. In some cases, the editing of the second portion of the shared document at the temporary preview may not affect the capabilities provided at the user interface 400 and in relation to the first portion displayed there for the first user. In some instances, the first user can perform sequential changes to the first and second portion of the shared document by using editing capabilities provided by the main user interface 400 in relation to the first portion and the editing capabilities provided by the temporary preview 430. In some instances, the editing capabilities at the main user interface 400 for the first portion of the document and at the temporary preview 430 may be identical, substantially similar, or different.

In some implementations, the temporary preview 430 can be located outside of the display area of the first portion of the document that is being viewed by the first user by, for example, zooming in the display area of the first portion of the shared document at a predefined area on the user interface 400 and presenting the temporary preview 430 at an area that does not overlap with that predefined area for the first portion. In some implementations, editing within the temporary preview 430 done in the second portion of the shared document (the one that is also displayed at another instance of the collaboration application by the related user to that preview) can be performed as if editing is executed by the second user. The user interface element allows the editing operation without losing the display of the first portion of the shared document corresponding to the first location in the user interface of the first user.

In some implementations, when the first user is peeking at the view of user B at the temporary preview 430, the first user can interact with the menu 410 to provide reactions for the content presented at the temporary preview 430. For example, the menu 410 includes thumbs up/down, eyes, ok, and thinking icons, among other example icons that can be included in menu 410 to facilitate sending of dynamic feedback for content previewed at the temporary preview.

In some implementations, by providing the option to share a temporary preview of another user within the user interface of a current first user, the current user is provided with the option to perform view peeking, and monitor how another user is interacting and/or editing the shared document at another location of the document, that he is not currently viewing in the main portion of his user interface view into the document, and also where such peeking is performed without changing the display of the first portion of the shared document at the first location that is viewed at the user interface 400 of FIG. 4A.

Figure 5:
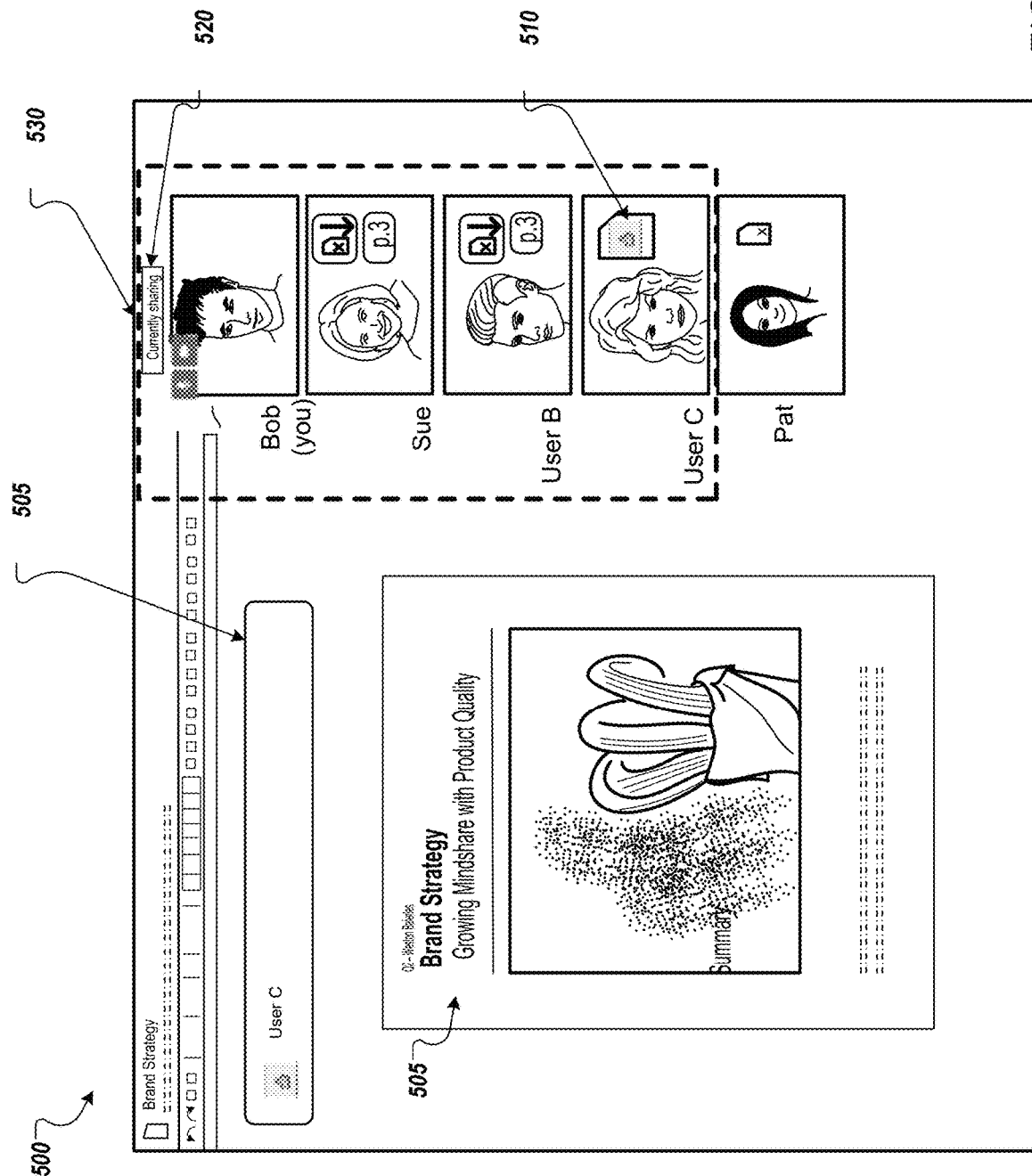
FIG. 5 shows an example user interface of a collaboration application that supports sharing of views of different users and supports the definition of subgroups within the users based on the view locations in accordance with implementations of the present disclosure.

FIG. 5 shows an example of a user interface 500 of a collaboration application that supports sharing of views of different users and supports the definition of subgroups within the users based on the view locations in accordance with implementations of the present disclosure. In some implementations, the user interface 500 of the collaboration application can substantially correspond to the user interface 122 on the display device 120 of FIG. 1, the user interface of the first user as described for FIG. 2, the user interface 300 of FIG. 3, and the user interface 400 of FIG. 4A.

In some implementations, the collaboration application is accessed through multiple instances by each (or a subset of) the set of users that can participate in a conference call to collaboratively edit a shared document 305. In some implementations, the set of users that interact over the shared document can be more than three users and, during the interaction, different portions of the document may be edited or reviewed by each user separately, forming a group of at least two users, or as a joined editing operation performed by all the users.

In some implementations, the example user interface 500 presents the view of a first user (Bob), where the first user is the one who is sharing his view with the rest of the users. For example, the sharing can be initiated through a sharing interaction button 520 provided on the example user interface 500. The user interface 500 also includes document 505 for the other viewers with whom the first user's view is shared. In some instances, the document 505 can be the same as the document 130 of FIG. 1, or the document 305 of FIG. 3, and can be provided in the context of a conference call between multiple users, where at least some of the users are viewing the shared document and a conversation between at least three of the users is identified. The users can send feedback to each other and with respect to a view that they are either previewing as a shared preview, or a view that they may request to see as a temporary preview as described in relation to FIGS. 4A and 4B. In some instances, the users can provide feedback with interaction icons to the currently sharing first user, such as thumbs up as shown on FIG. 5. Such interactive feedback can also be presented as an icon associated with an image avatar of the user who provided the feedback as shown at 510. In some implementations, at the user interface 530 of Bob who is currently sharing, a text box user interface element that lays over the displayed view of the shared document of Bob that is shared in the conference call is displayed. The text box can identify the received interactive feedback during the conference call and while Bob was sharing his view with the other users part of the conference call.

In some implementations, location information for each user who is participating in the conference call and viewing or editing the document can be determined. The location information can be collected from each of the instances of the collaboration application used by each of the users. In some cases, the location details for each user can be collected at a management component of the collaboration application. For example, each instance can push the location information to that component, or the management component can pull the location information from the instances, e.g., on a predefined periodic interval. The collection of the location information can be iteratively and/or periodically performed and evaluated.

In some implementations, in response to identifying a set of locations within the shared document correspondingly associated with interactions performed by the set of users collaboratively working with the shared document, one or more subgroups are defined. The subgroups can be defined based on grouping the users according to the proximity of the users locations within the set of locations in the shared document. For example, if two users are determined to be associated with two locations that are within a threshold distance (can be identified as in close proximity, such as within one page of each other), the collaboration application can push information to the instances of the collaboration applications of these two users to propose to define a subgroup for these two users.

In some implementations, two or more users can voluntarily initiate to be separated (or split from the rest of the users) into a subgroup and participate in a conference call that includes only the users from the defined subgroup. In such manner, one conference call can be divided into two separate sessions that can perform parallel and joint collaboration over the shared document.

In some implementations, based on the evaluation of locations of the users associated with the conference call that is handled during the presentation of view 500 for a first user, a first subgroup 530 can be defined for a subset of four users as those users are identified to perform interactions with the shared document 505 at locations within a close proximity, e.g., all of them working on Chapter 5, or on page three (3) of the document 505.

In some implementations, the subgroup 530 is defined to include a subset of the set of users that preview portions of the shared document that overlap (overlay) at least at a threshold portion. For example, the displayed portion by each of these users overlays the displayed portion of each of the other users at least above a threshold value, e.g., 30% displayed portion of the document.

In some implementations, one or more subgroups such as the subgroup 530 can be defined to seamlessly transition between individual work of editing the shared document to subgroup work. In some implementations, a set of users part of the conference call and interacting over a shared document through a collaboration application can be dynamically arranged into a sequence of different group and/or individual setups that fluidly follow the collaboration process. For example, an initial work in pairs can transition into individual work to further transition into bigger group collaboration. Such transition between different forms of collaboration can be configured to be determined either based on a predefined collaboration plan, or based on a dynamic evaluation of the interaction of the users (active/passive users), portions of the document that they are viewing and/or editing, roles of the user in the process, defined stages of the collaboration process, among other further considerations to be taken into account during the determination of transitioning between different forms of collaboration and communication splitting into 2 or more groups or merging into a whole-group phase.

In some implementations, evaluation of interactions and viewing activities of portions of the shared document by different users can contribute to determining simple transitions between collaborative states, where it can be dynamically determined whether to share views between subsets of users based on evaluated interactions and positioning information.

Figure 6:
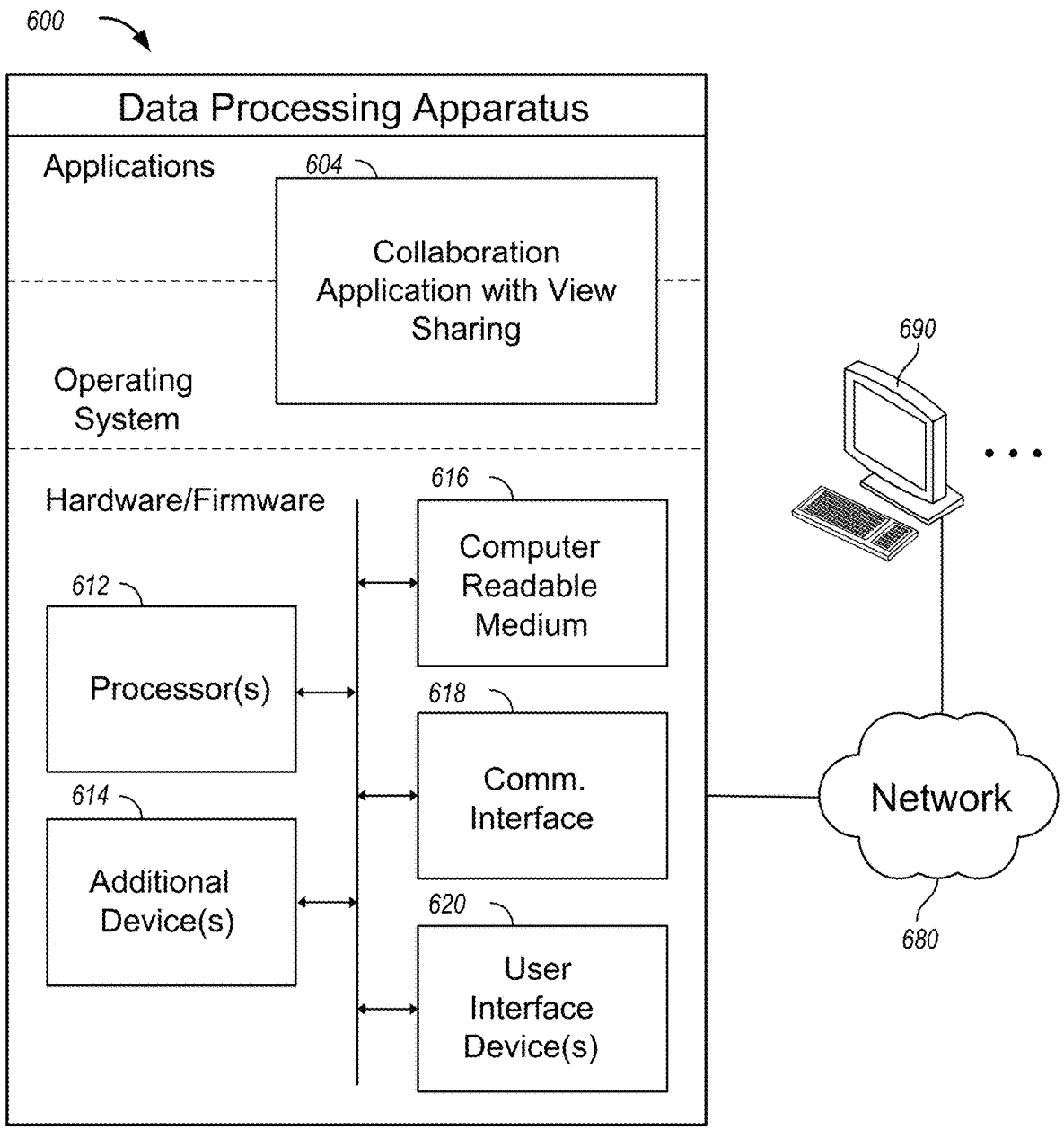
FIG. 6 is a schematic diagram of a data processing system including a data processing apparatus, which can be programmed as a client or as a server.

FIG. 6 is a schematic diagram of a data processing system including a data processing apparatus 600, which can be programmed as a client or as a server. The data processing apparatus 600 is connected with one or more computers 690 through a network 680. While only one computer is shown in FIG. 6 as the data processing apparatus 600, multiple computers can be used. The data processing apparatus 600 includes various software modules, which can be distributed between an applications layer and an operating system. These can include executable and/or interpretable software programs or libraries, including tools and services of a collaboration application with view sharing 604 that includes a user interface that allows sharing of portions of a document viewed by a user of the collaboration application 604. The collaboration application 604 can provide a user interface where an indication specifying a relative locational direction from a currently displayed document location towards a document location displayed by another user of another instance of the application as described, for example, at FIGS. 1, 2, 3, 4A, and 4B, and throughout the present disclosure. Further, the collaboration application 604 can implement conference call functionalities, document sharing and editing, and determination of locations within the shared document that are viewed by the user, among other functionality as described throughout the present disclosure. The number of software modules used can vary from one implementation to another. Moreover, the software modules can be distributed on one or more data processing apparatus connected by one or more computer networks or other suitable communication networks.

The data processing apparatus 600 also includes hardware or firmware devices including one or more processors 612, one or more additional devices 614, a computer readable medium 616, a communication interface 618, and one or more user interface devices 620. Each processor 612 is capable of processing instructions for execution within the data processing apparatus 600. In some implementations, the processor 612 is a single or multi-threaded processor. Each processor 612 is capable of processing instructions stored on the computer readable medium 616 or on a storage device such as one of the additional devices 614. The data processing apparatus 600 uses the communication interface 618 to communicate with one or more computers 690, for example, over the network 680. Examples of user interface devices 620 include a display, a camera, a speaker, a microphone, a tactile feedback device, a keyboard, a mouse, and VR and/or AR equipment. The data processing apparatus 600 can store instructions that implement operations associated with the program(s) described above, for example, on the computer readable medium 616 or one or more additional devices 614, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other units suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors, executing one or more computer programs to perform functions by operating on input data and generating output. The processes and logic flows can also be performed by, and apparatus can also be implemented as, special purpose logic circuitry, e.g., a field programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a liquid crystal display (LCD) device, an organic light emitting diode (OLED) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other, and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface, through which a user can interact with an implementation of the subject matter described in this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

Examples

Although the present application is defined in the attached claims, it should be understood that the present invention can also (additionally or alternatively) be defined in accordance with the following examples:

Example 1: A method comprising:
   displaying, in a user interface of a first instance of a collaboration application of a first user, a first portion of a shared document to the first user, wherein the displayed first portion comprises a first location of the first user within the shared document; and
   providing, in the user interface of the first user, an indication specifying a relative locational direction from the first location towards a second location of a second user within the shared document,
      wherein a second portion of the shared document is being displayed to the second user through a second instance of the collaboration application during a conference call between a set of users comprising the first user and the second user, and
      wherein the displayed second portion of the shared document comprises the second location of the second user within the shared document.

Example 2. The method of Example 1, wherein providing the indication specifying the relative locational direction comprises:
   displaying a pop-up indicator in the user interface of the first user to provide details of the second location of the second user at the shared document, while keeping the first location of the first user shown in the user interface of the first user.

Example 3. The method of Example 1 or Example 2, wherein the indication is provided in the user interface of the first user in response to identification of the second user as an active speaker during the conference call.

Example 4. The method of any one of the preceding Examples, wherein the indication specifying the relative locational direction is pushed to the user interface of the first user as a pop-up indicator in response to identifying that the second user is an active speaker during the conference call, wherein the method comprises:

in response to hovering over the pop-up indication pushed to the user interface of the first user, providing a temporary preview of the second portion of the shared document within the user interface of the first user, while keeping the first location of the first user shown in the user interface of the first user, wherein the temporary preview of the second portion of the shared document at least partially overlays the displayed first portion of the shared document in the user interface of the first user.

Example 5. The method of Example 4, wherein the temporary preview of the second portion of the shared document is a user interface element that allows the first user to perform an editing operation on the shared document in the second portion of the shared document, wherein the user interface element allows the editing operation without losing the display of the first portion of the shared document corresponding to the first location in the user interface of the first user.

Example 6. The method of any one of the preceding Examples, comprising:

in response to determining that the second user is a current speaker, displaying a temporary preview of the second portion of the shared document within the user interface of the first user.

Example 7. The method of Example 6, wherein the temporary preview is displayed without changing the displaying of the first portion of the shared document at the first location, and wherein the temporary preview is at least partially overlaying the displayed first portion of the shared document.

Example 8. The method of any one of the preceding Examples, comprising:

in response to receiving a user interaction of the first user with the provided indication, automatically moving the displayed first portion from the first location to the second location in the shared document in response to receiving a user interaction of the first user with the provided indication.

Example 9. The method of any one of the preceding Examples, wherein the conference call comprises a video conference call, and wherein the method comprises:

displaying icons overlaid on video feeds of a set of users collaboratively working on the shared document, wherein the icons identify collaboration statuses of the set of users relevant to the shared document, wherein at least one status of a user identifies a current viewing position, wherein the current viewing position comprises positions within the shared document and within the collaboration application.

Example 10. The method of any one of the preceding Examples, comprising:

in response to identifying a set of locations within the shared document correspondingly associated with interactions performed by a set of users collaboratively working with the shared document, defining one or more subgroups based on grouping according to proximity of locations within the set of locations in the shared document, wherein a first subgroup is defined to comprise a subset of the set of users that preview portions of the shared document that overlap at least at a threshold portion, wherein the subset of the set of users comprises at least two users, and the set of users comprises at least three users.

Example 11. The method of any one of the preceding Examples, wherein the indication specifying the relative locational direction from the first location towards the second location of the second user within the shared document is defined only within a single dimension of the shared document.

Example 12. The method of any one of the preceding Examples, wherein the shared document is a three-dimensional modeling document defining an object in a three-dimensional space, wherein the relative locational direction comprises a three-dimensional arrow.

Similar operations and processes as describes in Examples 1 to 12 can be performed in a system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 12 can also be implemented.

What is claimed is:

1. A computer-implemented method comprising:
displaying, in a user interface of a first instance of a collaboration application of a first user, a first portion of a shared document to the first user, wherein the displayed first portion comprises a first location of the first user within the shared document, and wherein the shared document is a three-dimensional modeling document defining an object in a three-dimensional space; and
providing, in the user interface of the first user, an indication specifying a relative locational direction from the first location towards a second location of a second user within the shared document,
    wherein a second portion of the shared document is being displayed to the second user through a second instance of the collaboration application during a conference call between a set of users comprising the first user and the second user,
    wherein the displayed second portion of the shared document comprises the second location of the second user within the shared document, and
    wherein the relative locational direction comprises a three-dimensional arrow.

2. The method of claim 1, wherein providing the indication specifying the relative locational direction comprises:
displaying a pop-up indicator in the user interface of the first user to provide details of the second location of the second user at the shared document, while keeping the first location of the first user shown in the user interface of the first user.

3. The method of claim 1, wherein the indication is provided in the user interface of the first user in response to identification of the second user as an active speaker during the conference call.

4. The method of claim 1, wherein the indication specifying the relative locational direction is pushed to the user interface of the first user as a pop-up indicator in response to identifying that the second user is an active speaker during the conference call, wherein the method comprises:
in response to hovering over the pop-up indication pushed to the user interface of the first user, providing a temporary preview of the second portion of the shared document within the user interface of the first user, while keeping the first location of the first user shown in the user interface of the first user, wherein the temporary preview of the second portion of the shared document at least partially overlays the displayed first portion of the shared document in the user interface of the first user.

5. The method of claim 4, wherein the temporary preview of the second portion of the shared document is a user interface element that allows the first user to perform an editing operation on the shared document in the second portion of the shared document, wherein the user interface element allows the editing operation without losing the display of the first portion of the shared document corresponding to the first location in the user interface of the first user.

6. The method of claim 1, comprising:
in response to determining that the second user is a current speaker, displaying a temporary preview of the second portion of the shared document within the user interface of the first user.

7. The method of claim 6, wherein the temporary preview is displayed without changing the displaying of the first portion of the shared document at the first location, and wherein the temporary preview is at least partially overlaying the displayed first portion of the shared document.

8. The method of claim 1, comprising:
in response to receiving a user interaction of the first user with the provided indication, automatically moving the displayed first portion from the first location to the second location in the shared document in response to receiving a user interaction of the first user with the provided indication.

9. The method of claim 1, wherein the conference call comprises a video conference call, and wherein the method comprises:
displaying icons overlaid on video feeds of a set of users collaboratively working on the shared document, wherein the icons identify collaboration statuses of the set of users relevant to the shared document, wherein at least one status of a user identifies a current viewing position, wherein the current viewing position comprises positions within the shared document and within the collaboration application.

10. The method of claim 1, comprising:
in response to identifying a set of locations within the shared document correspondingly associated with interactions performed by a set of users collaboratively working with the shared document, defining one or more subgroups based on grouping according to proximity of locations within the set of locations in the shared document, wherein a first subgroup is defined to comprise a subset of the set of users that preview portions of the shared document that overlap at least at a threshold portion, wherein the subset of the set of users comprises at least two users, and the set of users comprises at least three users.

11. A non-transitory, computer-readable medium coupled to one or more processors and having instructions stored thereon which, when executed by the one or more processors, cause the one or more processors to perform operations, the operations comprising:

displaying, in a user interface of a first instance of a collaboration application of a first user, a first portion of a shared document to the first user, wherein the displayed first portion comprises a first location of the first user within the shared document, and wherein the shared document is a three-dimensional modeling document defining an object in a three-dimensional space; and
providing, in the user interface of the first user, an indication specifying a relative locational direction from the first location towards a second location of a second user within the shared document,
wherein a second portion of the shared document is being displayed to the second user through a second instance of the collaboration application during a conference call between a set of users comprising the first user and the second user,
wherein the displayed second portion of the shared document comprises the second location of the second user within the shared document, and
wherein the relative locational direction comprises a three-dimensional arrow.

12. The computer-readable medium of claim 11, wherein providing the indication specifying the relative locational direction comprises:
displaying a pop-up indicator in the user interface of the first user to provide details of the second location of the second user at the shared document, while keeping the first location of the first user shown in the user interface of the first user.

13. The computer-readable medium of claim 11, wherein the indication is provided in the user interface of the first user in response to identification of the second user as an active speaker during the conference call.

14. The computer-readable medium of claim 11, wherein the indication specifying the relative locational direction is pushed to the user interface of the first user as a pop-up indicator in response to identifying that the second user is an active speaker during the conference call,
wherein the instructions comprise instructions which when executed by the one or more processors, cause the one or more processors to perform operations, the operations comprising:
in response to hovering over the pop-up indication pushed to the user interface of the first user, providing a temporary preview of the second portion of the shared document within the user interface of the first user, while keeping the first location of the first user shown in the user interface of the first user, wherein the temporary preview of the second portion of the shared document at least partially overlays the displayed first portion of the shared document in the user interface of the first user.

15. The computer-readable medium of claim 14, wherein the temporary preview of the second portion of the shared document is a user interface element that allows the first user to perform an editing operation on the shared document in the second portion of the shared document, wherein the user interface element allows the editing operation without losing the display of the first portion of the shared document corresponding to the first location in the user interface of the first user.

16. The computer-readable medium of claim 14, wherein the temporary preview is displayed without changing the displaying of the first portion of the shared document at the first location, and wherein the temporary preview is at least partially overlaying the displayed first portion of the shared document.

17. A system comprising:
 a computing device; and
 a computer-readable storage device coupled to the computing device and having instructions stored thereon which, when executed by the computing device, cause the computing device to perform operations, the operations comprising:
  displaying, in a user interface of a first instance of a collaboration application of a first user, a first portion of a shared document to the first user, wherein the displayed first portion comprises a first location of the first user within the shared document, and wherein the shared document is a three-dimensional modeling document defining an object in a three-dimensional space; and
  providing, in the user interface of the first user, an indication specifying a relative locational direction from the first location towards a second location of a second user within the shared document,
   wherein a second portion of the shared document is being displayed to the second user through a second instance of the collaboration application during a conference call between a set of users comprising the first user and the second user,
   wherein the displayed second portion of the shared document comprises the second location of the second user within the shared document, and
   wherein the relative locational direction comprises a three-dimensional arrow.

18. The system of claim 17, wherein providing the indication specifying the relative locational direction comprises:
 displaying a pop-up indicator in the user interface of the first user to provide details of the second location of the second user at the shared document, while keeping the first location of the first user shown in the user interface of the first user.

19. The system of claim 17, wherein the indication is provided in the user interface of the first user in response to identification of the second user as an active speaker during the conference call.

20. The system of claim 17, wherein the indication specifying the relative locational direction is pushed to the user interface of the first user as a pop-up indicator in response to identifying that the second user is an active speaker during the conference call,
 wherein the computer-readable storage device includes further instructions stored thereon which, when executed by the computing device, cause the computing device to perform operations comprising:
  in response to hovering over the pop-up indication pushed to the user interface of the first user, providing a temporary preview of the second portion of the shared document within the user interface of the first user, while keeping the first location of the first user shown in the user interface of the first user, wherein the temporary preview of the second portion of the shared document at least partially overlays the displayed first portion of the shared document in the user interface of the first user,
  wherein the temporary preview of the second portion of the shared document is a user interface element that allows the first user to perform an editing operation on the shared document in the second portion of the shared document, wherein the user interface element allows the editing operation without losing the display of the first portion of the shared document corresponding to the first location in the user interface of the first user.

* * * * *